United States Patent [19]

Kimpel

[11] 4,350,787

[45] Sep. 21, 1982

[54] THERMOPLASTIC ERASER

[75] Inventor: Günter Kimpel, Neumarkt, Fed. Rep. of Germany

[73] Assignee: J. S. Staedtler, Nuremberg, Fed. Rep. of Germany

[21] Appl. No.: 233,291

[22] Filed: Feb. 10, 1981

[30] Foreign Application Priority Data

Feb. 13, 1980 [DE] Fed. Rep. of Germany ....... 3005298

[51] Int. Cl.³ .............................................. C08K 5/36
[52] U.S. Cl. ..................................... 524/302; 525/97
[58] Field of Search ................ 260/23.7 M, 33.6 AQ, 260/42.47; 525/97

[56] References Cited

U.S. PATENT DOCUMENTS

| | | | |
|---|---|---|---|
| 3,607,819 | 9/1971 | Beckman | 260/23.7 M |
| 3,614,836 | 10/1971 | Snyder | 260/33.6 AQ |
| 3,738,951 | 6/1973 | Middlebrook | 260/23.7 M |
| 4,096,203 | 6/1978 | St. Clair | 260/33.6 AQ |
| 4,107,124 | 8/1978 | Himes | 260/33.6 AQ |

*Primary Examiner*—Paul R. Michl
*Attorney, Agent, or Firm*—Toren, McGeady & Stanger

[57] ABSTRACT

An eraser composed of conventional fillers and additives and, in addition, a binder of a styrene-isoprene-styrene block copolymer. The eraser composition does not require any aftertreatment, e.g., vulcanization, and can be fabricated into erasers utilizing single equipment.

8 Claims, No Drawings

THERMOPLASTIC ERASER

BACKGROUND OF THE INVENTION

1. Field of the Invention

The invention relates to an eraser, composed of fillers, a thermoplastic material based on synthetic rubber as the binder and other additives.

2. Description of the Prior Art

In a known eraser of this type, as disclosed in Belgian Pat. No. 673,229, it is proposed to use polychloroprene, chlorosulfonated polyethylene, polybutadiene, polyacrylonitrile or polyisobutylene as the binder.

However, this eraser was found to be disadvantageous because an additional vulcanization process or a peroxidic crosslinking is required due to the selected binders. In addition, as a rule, softeners, such as, for example, chloroparaffins, which have a great tendency to migrate, are required.

In accordance with another proposal as disclosed in U.S. Pat. No. 3,738,951, a butadiene-styrene block polymer with a butadiene to styrene ratio of 4:1 to 1:1 (80:20 to 50:50%) is used as the binder. Furthermore, in this case, the use of a very high portion of factice and naphthenic oil is proposed as softeners.

Since factice as well as naphthenic oils are relatively expensive components, these known mixtures always result in relatively expensive final products.

SUMMARY OF THE INVENTION

I have discovered an eraser which does not have the above-mentioned disadvantages and, therefore, does not require an additional aftertreatment, e.g., vulcanization, and which requires a smaller amount of expensive additives. The eraser of the present invention is thus especially economical and, for example, can be extruded without complicated manufacturing devices or can be produced by injection molding.

More particularly, the eraser of the present invention is composed of conventional fillers and other additives and, as a binder, a styrene-isoprene-styrene block copolymer (sometimes referred to as a SIS block copolymer).

DESCRIPTION OF THE PREFERRED EMBODIMENT

It is advantageous in the eraser composition when the SIS block copolymer has a styrene portion of 10 to 20% by weight. Furthermore, it is particularly advantageous to admix about 1 to 25% by weight of stereospecific, liquid, low-viscosity polybutadiene into the binder or the eraser composition. In this way, the hardness of the final product can be easily controlled.

The admixed polybutadiene preferably has a molecular weight between 1,000 to 4,000 and a viscosity of 700 to 3,000 mPa.s.

Furthermore, it is advantageous when the polybutadiene has 70 to 80% 1,4 cis-double bonds, 15 to 30% 1,4 trans-double bonds and 1 to 5% vinyl double bonds.

It has also been found advantageous to add 0.5 to 5% polynorbornene (a polymer of di-cyclopentadiene) to the composition. This improves and increases the abrasion which is particularly important for satisfactory functioning of the eraser. This polynorbornene can be added in addition to the conventional inorganic fillers.

Since polynorbornene has an especially great specific surface and, therefore, an extremely good capability to absorb fats and oils, this makes it possible to achieve an especially fine and absorptive abrasion.

It is also possible to add, alternatively or as a supplement, relatively small amounts of factice (chlorinated and/or sulfurized plant oil) to achieve further improvements in the abrasion and, in turn, the erasing properties.

Moreover, it has been found that, in place of polybutadiene or in conjunction with the polybutadiene, it is advantageous to add relatively small amounts of naphthenic and/or paraffinic oils as a plasticizer.

Materials suitable for use as fillers include the conventional materials, such as, chalk, clay, amorphous silicic acid, pumice powder, powdered quartz or glass or the like.

Through the use of the proposed thermoplastic binder and the additives noted above, the eraser can be produced in a very simple manner by extruding, injection molding, or similar production processes and is ready to use without any aftertreatment.

Furthermore, manufacturing waste, such as, erasers which are incorrectly cut or imprinted, can be completely processed once again by a renewed thermal preparation, for example, in fluid mixers.

The following examples further illustrate the present invention. The quantities are given in parts by weight and, since they are in reference to 100, are simultaneously given in percent by weight.

| Material | (In parts by weight or % by weight) EXAMPLES | | | | |
|---|---|---|---|---|---|
|  | 1 | 2 | 3 | 4 | 5 |
| SIS-block copolymer* | 20 | 20 | 30 | 10 | 20 |
| Polybutadiene | 10 | — | — | 10 | — |
| Chalk | 63.7 | — | 39 | 44.2 | 20 |
| Clay | — | 63.7 | — | — | — |
| Pumice Powder | — | — | 25 | 30 | 48.7 |
| Polynorbornene | 1 | 1 | 0.5 | 0.5 | 1 |
| Factice | 5 | 5 | 5 | 5 | — |
| Naphthenic oil | — | 10 | — | — | 10 |
| Antioxidants | 0.2 | 0.2 | 0.3 | 0.1 | 0.2 |
| Colorants | 0.1 | 0.1 | 0.2 | 0.2 | 0.1 |

*for example "CARIFLEX" TR 1107, a product of Deutsche Shell Chemie Grubh, Frankfurt/Main; Federal Rep of Germany

What is claimed is:

1. In an eraser composition composed of fillers, a thermoplastic synthetic rubber as the binder, and conventional additives, the improvement which comprises the binder being a styrene-isoprene-styrene block copolymer having a styrene portion of 10 to 20% by weight and further containing 0.5 to 5% by weight polynorbornene.

2. The eraser of claim 1 which further contains 1 to 25% by weight stereospecific, liquid, low-viscosity polybutadiene.

3. The eraser of claim 2 wherein the low-viscosity polybutadiene has a molecular weight of 1,000 to 4,000 and a viscosity of 700 to 3,000 mPa.s.

4. The eraser of claim claim 1, 2, or 3 wherein the low-viscosity polybutadiene has 70 to 80% 1,4 cis double bonds, 15 to 30% 1,4 trans double bonds and 1 to 5% vinyl double bonds.

5. The eraser of claim 1, 2, or 3 which contains 5 to 20% by weight factice.

6. The eraser of claim 1, 2, or 3 which contains 5 to 20% by weight factice.

7. The eraser of claim 1, 2, or 3 which contains 5 to 20% by weight naphthenic oils.

8. The eraser of claim 1, 2, or 3 which contains 1 to 20% by weight paraffinic oil.

* * * * *

UNITED STATES PATENT AND TRADEMARK OFFICE
CERTIFICATE OF CORRECTION

PATENT NO. : 4,350,787
DATED : September 21, 1982
INVENTOR(S) : Günter Kimpel

It is certified that error appears in the above-identified patent and that said Letters Patent is hereby corrected as shown below:

ON THE TITLE PAGE,

Abstract [57], line 5,

Change "single" to --simple--.

Signed and Sealed this

First Day of February 1983

[SEAL]

Attest:

GERALD J. MOSSINGHOFF

Attesting Officer   Commissioner of Patents and Trademarks